US005792830A

United States Patent [19]

Noding et al.

[11] Patent Number: 5,792,830
[45] Date of Patent: Aug. 11, 1998

[54] PROCESS FOR PREPARING POLYANILINE

[75] Inventors: Stephen A. Noding, Brusly, La.; Susan J. Babinec; Carey L. Scortichini, both of Midland, Mich.

[73] Assignee: The Dow Chemical Company, Midland, Mich.

[21] Appl. No.: 762,481

[22] Filed: Dec. 9, 1996

[51] Int. Cl.$^6$ .............................. C08L 49/00; C08F 6/00
[52] U.S. Cl. .................... 528/422; 528/210; 528/212; 528/214; 528/391; 525/540; 252/500
[58] Field of Search .................... 528/422, 210, 528/212, 214, 391; 525/540; 252/500

[56] References Cited

U.S. PATENT DOCUMENTS

| | | | |
|---|---|---|---|
| 5,324,453 | 6/1994 | Cao et al. | 528/422 |
| 5,371,182 | 12/1994 | Galaj et al. | 528/422 |
| 5,403,913 | 4/1995 | MacDiarmid et al. | 528/422 |
| 5,420,237 | 5/1995 | Zemel et al. | 528/422 |
| 5,436,317 | 7/1995 | Järvinen et al. | 528/422 |
| 5,470,505 | 11/1995 | Smith et al. | 252/500 |
| 5,574,131 | 11/1996 | Ona | 528/422 |

FOREIGN PATENT DOCUMENTS

| | | |
|---|---|---|
| 062 00017 | 10/1994 | Japan . |
| 94/10327 | 5/1995 | WIPO . |

OTHER PUBLICATIONS

Akkara, Joseph A., et al., "Characterization of Polyaniline Synthesized by Enzyme–Catalyzed Reactions in Organic Solvents", Indian Journal of Chemistry, vol. 31B, pp. 855–858 (1992) The month of the date of publication is not available.

Akkara, Joseph A., et al., "Opitcal Properties of Polyaniline Synthesized by Enzyme–Catalyzed Reactions in Organic Solvents", Frontiers of Polymers and Advanced Materials, pp. 531–537 (1994) The month of the date of publication is not available.

Akkara, Joseph A., "Polyaniline Synthesized by Enzyme–Catalyzed Reactions in Organic Solvents", Polymer Materials Science Engineering, vol. 66, pp. 374–375 (1992) The month of the date of publication is not available.

Gospodinova, N., et al., "Influence of Hydrolysis on the Chemical Polymerization of Aniline", Polymer, vol. 35, No. 14, pp. 3102–3106 (1994) The month of publication date is not available.

Liu, Chang–Feng, et al., "Preparation of Polymer Blend Colloids Containing Polyaniline or Polypyrrole by Fe(II)–, Fe(III), and Cu(II)–$H_2O_2$ Catalyst System", Polymer Journal, vol. 25, No. 7, pp. 775–779 (1983) The month of publication date is not available.

Liu, Jia–Ming, et al., "Novel Colloidal Polyaniline Fibrils Made by Template Guided Chemical Polymerization", J. Chem. Soc., Chem. Commun, pp. 1529–1531 (1991) The month of publication date is not available.

Sun, Linfeng, et al., "Template–Guided Synthesis of Conducting Polymers—Molecular Complex of Polyaniline and Polyelectrolyte", Polymer Prepr., vol. 33, pp. 379–380 (1992) The month of publication date is not available.

Sun, Zaicheng, et al., "Chemical Polymerization of Aniline with Hydrogen Peroxide as Oxidant ", Received Jul. 28, 1996 The month of publication date is not available.

Sun, Z., et al., "Chemical Polymerization of Aniline by Hydrogen Peroxide", International Conference on Science and Technology of Synthetic Metals, Snow Bird, Utah (Jul. 28, 1996) The month of publication date is not available.

Moon, Doo–Kyung, et al., "Synthesis of Poly (1–aminonaphthalene) and Poly(1–aminoanthracene) by Chemical Oxidative Polymerization and Characterization of the Polymers" Macromolecules, vol. 26, pp. 6992–6997 (1993)The month of publication date is not available.

Österholm, Jan–Erik, et al., "Emulsion Polymerization of Aniline", Polymer, vol. 35, No. 13, pp. 2902–2906 (1994) The month of publication date is not available.

Pron, A., et al., "The Effect of the Oxidation Conditions on the Chemical Polymerization of Polyaniline", Synthetic Metals, Vol. 24, pp. 193–201 (1988) The month of publication date is not available.

Moon, Doo–Kyung, et al., "Chemical Oxidation of Polyaniline by Radical Generating Reagents", Chemistry Letters, pp. 1633–1636 (1991) The month of publication date is not available.

Moon, Doo–Kyung, et al., "Kinetic Study on Chemical Oxidation of Leucoemeraldine Base Polyaniline to Emeraldine Base", Macromolecules, vol. 26, pp. 364–369 (1993) The month of publication date is not available.

Moon, Doo Kyung, et al., "Preparation of Polyaniline by Oxidation of Aniline Using $H_2O_2$ in the Presence of an Iron(II) Catalyst", Makromol. Chem., vol. 193, pp. 1723–1728 (1992) The month of publication date is no tavailable.

March, Jerry, Advanced Organic Chemistry: Reactions, Mechanisms, and Structure—Third Edition, A Wiley–Interscience Publication (New York), pp. 628–629 (1985) The month of publication date is not available.

*Primary Examiner*—P. Hampton-Hightower
*Attorney, Agent, or Firm*—Ann K. Galbraith

[57] ABSTRACT

Described is a process for preparing polyaniline polymer which includes contacting aniline monomers with (a) hydrogen peroxide, (b) at least one acid, including hydrogen chloride, hydrogen bromide, or a mixture thereof, and (c) a catalytic amount of at least one metal-containing compound or complex, under reaction conditions sufficient to form a polymerization reaction product containing a polyaniline polymer. It has been discovered that the processes described herein provide means to prepare polyaniline having a relatively high conductivity at a high degree of aniline monomer conversion using hydrogen peroxide as an oxidant.

48 Claims, No Drawings

PROCESS FOR PREPARING POLYANILINE

BACKGROUND OF THE INVENTION

Polyaniline is a well-known polymer which is typically prepared from aniline by a process which involves subjecting aniline to oxidizing conditions. Typically, the oxidant is a persulfate salt. However, this oxidant is relatively expensive and produces salt as a reaction byproduct. Other methods have been described for the preparation of polyaniline utilizing hydrogen peroxide as the oxidant. Hydrogen peroxide is a preferred oxidant because it is relatively inexpensive and does not produce salt as a byproduct. However, known hydrogen peroxide processes typically produce a relatively low yield of polyaniline and/or a polyaniline product having a relatively low conductivity. A process for preparing polyaniline utilizing hydrogen peroxide as the oxidant, which would produce a polymer having a relatively high conductivity in a high yield and permit a relatively high conversion of the aniline monomer, would be desirable.

SUMMARY OF THE INVENTION

In one aspect, this invention is a batch process for preparing a polyaniline polymer which comprises contacting aniline monomers with (a) hydrogen peroxide, (b) at least one acid, including hydrogen chloride, hydrogen bromide, or a mixture thereof, and (c) a catalytic amount of at least one metal-containing compound or complex, forming a polymerization reaction mixture thereby, under reaction conditions sufficient to form a polymerization reaction product containing a polyaniline polymer, wherein:

(i) the total amount of aniline monomers added to the polymerization reaction mixture is at least 0.25 moles per liter, based on the volume of the polymerization reaction product;

(ii) the molar ratio of hydrogen peroxide:aniline monomers added to the reaction mixture is at least 0.3:1.0; and (iii) the molar ratio of acid:aniline monomers added to the reaction mixture is greater than 1:1.

In another aspect, this invention is a process for preparing a polyaniline polymer which comprises contacting aniline monomers with (a) hydrogen peroxide, (b) at least one Lewis acid other than hydrogen chloride or hydrogen bromide, (c) at least one metal-containing compound or complex, and (d) a source of chloride and/or bromide ions different from (b), forming a polymerization reaction mixture thereby, under reaction conditions sufficient to form a polymerization reaction product comprising a polyaniline polymer, wherein the molar ratio of acid:aniline monomers added to the reaction mixture is greater than 1:1.

It has been discovered that the processes of the invention provide means to prepare polyaniline having a relatively high conductivity at a high degree of aniline monomer conversion using hydrogen peroxide as an oxidant. Polymerization may be carried out in the presence of a variety of acids, directly providing polyanilines doped with these acids. Alternatively, the dopant acid present during the polymerization may be exchanged for a different dopant acid following the polymerization. These and other advantages of the invention will be apparent from the description which follows.

DETAILED DESCRIPTION

The polyaniline polymer product of the processes of the invention may be an insoluble solid that forms a precipitate, or may remain suspended, or may be soluble in the reaction mixture. The polyaniline polymer may have relatively low or high molecular weight, and may have monomeric or polymeric dopants or a mixture thereof.

The term "polyaniline polymer" as used herein means the polymerization reaction product resulting from the oxidation of the aniline monomers and the formation of head-to-tail bonds between the aniline monomers. Further, the terms "dopant", "doped", and variations thereof, as used herein, all refer to the formation of an electronically-conductive complex of a protonated polyaniline polymer and a suitable anion. An acidic medium is required to form the conductive complex, although the anionic portion thereof may be derived from the salt of an acid. "Dopant acid" as used herein refers to an acid which not only protonates the polyaniline polymer, but also provides the anion which forms part of the conductive complex. The terms "protonated derivative" and "protonate" as used herein refer to contacting the aniline monomer with an acid under conditions sufficient to form the corresponding anilinium cation, or to contacting the polyaniline polymer with an acid under conditions sufficient to form a radical cation thereon. Treatment or purification of the protonated aniline monomers prior to polymerization is not required. If the Lewis acid used to protonate the aniline monomer is polymeric (such as, for example, a polyacrylic acid), the acid may form a complex with the aniline monomer. Temperature, pressure, total reaction time, aniline monomer concentration, choice of acid(s), acid concentration, conversion of aniline monomer, amount of hydrogen peroxide added, hydrogen peroxide addition rate and amount of catalyst used are important processing variables. However, the most appropriate values for these variables depend on the desired properties for the polyaniline polymer, such as molecular weight, conductivity, solubility, or melt processability. For example, it may be desirable to add a particular Lewis acid to the reaction mixture so that such acid will be the dopant acid for the resulting polyaniline polymer. The use of the particular dopant acid may improve the solubility or melt-processing characteristics of the polymer. However, the addition of such acid to the polymerization reaction mixture may influence the rate of reaction (the rate of reaction may increase with an increase in acid concentrations, above a minimal pH), the efficiency of the hydrogen peroxide use (a particular acid may necessitate the use of more hydrogen peroxide to obtain a desired rate of conversion of the aniline monomers), and/or the aniline monomer solubility (when an acid other than HCl or HBr is utilized, the solubility of aniline complexed with such acid may be less than the solubility of the aniline monomer protonated using HCl or HBr alone). The ranges of values described below for these variables are intended to describe preferred methods for carrying out the processes of the invention. However, routine experimentation may be required to determine the best process conditions for a particular combination of aniline monomer and dopant acid.

The polymerization reaction is preferably carried out at a temperature of at least −20° C., more preferably at least −10° C., most preferably at least −5° C.; but preferably no greater than 60° C., more preferably no greater than 50° C., and most preferably no greater than 40° C.; and a pressure of at least 10 mm Hg, more preferably at least 25 mm Hg, and most preferably at least 50 mm Hg; but preferably no greater than 10 psig, more preferably no greater than 5 psig, and most preferably no greater than 0 psig. Under these conditions, the desired conversion may be obtained in a time period of at least 4 hours; but preferably no greater than 48 hours, more preferably no greater than 36 hours, and most preferably no greater than 24 hours.

The hydrogen peroxide is preferably added last to the reaction mixture; otherwise the order of addition is not important, unless a polymeric dopant acid is added to the reaction mixture (in which case the dopant acid is preferably complexed with the aniline monomer prior to the addition of the other reactants). Further, references herein to "contacting" aniline monomers in the presence of certain components of the reaction mixture mean that (i) the recited component is added to the reaction mixture, (ii) the recited component is formed in the reaction mixture in situ, (iii) the recited component reacts or complexes with other components of the reaction mixture or the aniline monomer prior to the formation of polyaniline polymer, or (iv) any combination of (i)-(iii) occurs. For example, the reaction products of combinations or subcombinations of a group of components, including compounds, salts, and complexes which may be formed by contacting the acid, catalyst, hydrogen peroxide, and aniline monomers, are included within the definition of a particular reaction mixture component, unless otherwise stated herein.

Preferably, sufficient hydrogen peroxide is added to the mixture to convert 30 percent, more preferably 40 percent, and most preferably 50 percent; but preferably not more than 99 percent, more preferably not more than 95 percent, and most preferably not more than 90 percent of the aniline. Although higher conversion of aniline monomers is generally desirable from a cost standpoint, high conversion may result in a decline in the quality of the product obtained. The progress of the reaction can be followed by gas chromatography or by some other means that will quantify the amount of aniline remaining. If the conversion of aniline is not as high as desired, additional hydrogen peroxide may be added at any time. The reaction mixture is preferably worked up as soon as possible once the desired conversion has been attained. Otherwise, the reaction conditions may favor the hydrolysis of the polyaniline, which may reduce its molecular weight and its conductivity. Preferably, the polyaniline polymer is separated from the reaction mixture before the average molecular weight of the polyaniline polymer in the reaction mixture at the time the desired conversion of aniline monomer is achieved is reduced by more than 50 percent, more preferably before it is reduced by more than 20 percent, and most preferably before it is reduced by more than 10 percent. In the event that the polyaniline polymer is insoluble in the reaction mixture, the work-up may consist of filtration and washing of the solid with at least 50 mL of water for every gram of reaction product, followed by washing with at least 50 mL of methanol for every gram of reaction product. In this case, because the reactants are separated from the product, the reaction is effectively terminated. In the event that the polyaniline polymer is soluble in the reaction mixture, this separation is not achieved, and the reaction will continue until the oxidant is depleted or somehow inactivated. The oxidant may be depleted by quenching the reaction mixture with base, but preferably the amount of peroxide added to the reaction mixture is carefully controlled so that it is substantially consumed when the desired conversion of aniline monomers has been achieved.

The term "aniline monomers" as used herein means compounds having the structure:

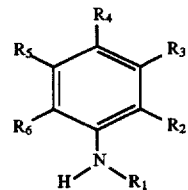

where $R_1$ is H, D, or alkyl and $R_2$-$R_6$ are, independently, H, D, alkyl, hydroxyl, alkenyl, alkoxy, alkoxyalkyl, cycloalkyl, cycloalkenyl, alkanoyl, alkylthio, aryloxyalkylthioalkyl, alkylaryl, arylalkyl, amino, alkylamino, dialkylamino, aryl, arylamino, diarylamino, alkylarylamino, alkylsulfinyl, alkylsulfinylalkyl, aryloxyalkyl, alkoxyalkyl, alkylsulfonyl, arylthio, arylsulfinyl, alkoxycarbonyl, arylsulfonyl, carboxylic acid, sulfonic acid, halogen, cyano, or alkyl substituted with one or more sulfonic acid, carboxylic acid, halo, nitro, cyano, or epoxy group; or any two R groups together may form an alkene or alkenylene chain completing a 3, 4, 5, or 6-membered aromatic or alicyclic ring, which ring may optionally include one or more divalent nitrogen, oxygen, or sulfur atoms, or boric, phosphoric, carboxylic, phosphonic, sulfinic, phosphinic, and sulfonic acids, salts or esters thereof, and their protonated derivatives. Preferably, any alkyl or alkylene substituents of the above-named groups contain less than 50 carbon atoms. Preferably, the aniline monomer is ortho-methoxy aniline, ortho-ethoxy aniline, or aniline, and is most preferably aniline. Preferably, the total amount of aniline monomers added to the polymerization reaction mixture is at least 0.3 moles of aniline monomer unit per liter of reaction volume, and more preferably at least 0.5 moles per liter; but is preferably no greater than 2 moles per liter, and more preferably no greater than 1 mole per liter. Preferably, the concentration of aniline monomers in the reaction mixture prior to the addition of the hydrogen peroxide is preferably at least 0.1 molar, more preferably at least 0.3 molar, most preferably at least 0.5 molar; but preferably no greater than 2 molar, more preferably no greater than 1.5 molar, and most preferably no greater than 1 molar.

Lewis acids suitable for use in the processes of the invention include acids which will protonate or form a complex with the aniline monomer which is sufficiently soluble in the polymerization reaction mixture to permit the polymerization to proceed. Examples of such include, but are not limited to, hydrochloric, hydrobromic, sulfuric, perchloric, nitric, methanesulfonic, trifluoromethanesulfonic, benzenesulfonic, toluenesulfonic, dodecylbenzenesulfonic, 10-camphorsulfonic, trichloroacetic, trifluoroacetic, polystyrene sulfonic, and polyacrylic. Aniline monomers generally have very low solubility in water, but their solubility is greatly increased by formation of protonated derivatives thereof or complexes with Lewis acids. The number of moles of Lewis acid in the reaction mixture is greater than the number of moles of aniline monomer at any given time. The Lewis acid is preferably employed in an amount to provide an initial excess proton concentration (over the amount which protonates or complexes with the aniline monomer) of at least 0.1 molar, more preferably at least 0.3 molar, most preferably at least 0.5 molar; but preferably no greater than 6 molar, more preferably no greater than 5 molar, and most preferably no greater than 4 molar.

Mixtures of Lewis acids may also be employed herein. If the process employs HCl or HBr as the major source of acid in the reaction mixture and the desired dopant acid is a different Lewis acid, the dopant acid may be added to the polymerization reaction mixture in addition to the HCl or HBr. If the dopant acid is a polymeric Lewis acid, such as a poly(acrylic acid), it may be preferable to permit it to complex with the aniline monomer prior to the addition of HCl or HBr to the reaction mixture. The use of polymeric acid dopants may be desirable to improve the melt-processability or solution-processability of the polyaniline polymer, depending on the particular end-use application for the polyaniline polymer. Further, salts of acids may be added to the reaction mixture for use as the dopant for the polyaniline polymer. However, such salts generally will not form a complex with aniline monomers and their use in the reaction mixture requires the use of an additional Lewis acid to complex with the aniline monomers to solubilize the aniline monomers in the reaction mixture. As the polymers are formed, the anionic portion of the Lewis acid salt will form a complex with a protonated polyaniline polymer if a Lewis acid which forms a complex with the aniline monomer is used to protonate the monomer (if the nature of the anions favors such ion exchange).

Alternatively, if a Lewis acid other than hydrogen chloride or hydrogen bromide is employed as the primary source of acid, a source of halide ions other than the catalyst should also be employed. Examples of halide sources include HCl, HBr, chloride and bromide salts of $NH_4^+$, quaternary ammonium cations, and alkali or alkaline earth cations. The concentration of halide ions in the polymerization reaction mixture is preferably at least 0.1 molar, more preferably at least 0.5 molar, most preferably at least 1.0 molar; but preferably no greater than 6 molar, more preferably no greater than 5 molar, and most preferably no greater than 4 molar.

Examples of suitable metal-containing compounds or complexes which may be used as catalysts include complexes of iron, copper, or ruthenium, such as ferrous sulfate, ferrous chloride, ferric chloride, cuprous chloride, cupric chloride, ruthenium trichloride, ruthenium tribromide, cuprous bromide, and cupric bromide. Preferably, the metal containing compound or complex is one that contains iron, such as ferrous sulfate heptahydrate. The term "catalytic amount" as used herein means that metal-containing compound or complex is used in an amount which, under the particular polymerization reaction conditions, will increase the rate of formation of the head-to-tail bonds between the aniline monomers in the mixture. However, the use of an unnecessarily large amount of such compounds or complexes is preferably avoided so that a separate process step for their removal from the product may also be avoided. Accordingly, the metal-containing compound or complex is used in an amount which is less than that necessary to increase the rate of polymerization if there were no hydrogen peroxide present in the reaction mixture. The particular amount of compound or is 5 complex which is optimal will depend on its activity and the desired reaction time, but is preferably present in an amount, based on hydrogen peroxide added, of at least 0.001 mole percent, more preferably at least 0.01 mole percent, and most preferably at least 0.1 mole percent; but preferably no greater than 20 mole percent, more preferably no greater than 10 mole percent, and most preferably no greater than 5 mole percent.

The reaction mixture preferably contains water or an organic solvent, which functions to dissolve the reactants and serve as a reaction medium. The water or solvent is preferably present in amounts sufficient to provide the desired concentration of reactants described elsewhere herein. The reaction mixture may be a single phase (except for precipitated polyaniline polymer), or carried out as a emulsion polymerization or interfacial process, if desired. Since unprotonated aniline monomers are typically insoluble in water, the reaction mixture is preferably sufficiently acidic to keep the aniline monomers protonated and water-soluble.

The selectivity of the converted aniline monomers to polyaniline polymers having an average molecular weight of greater than 2000 is preferably at least 50 percent, more preferably at least 70 percent, and most preferably at least 75 percent. The efficiency of the polymerization reaction (conversion of aniline monomer times selectivity) is preferably at least 15 percent, more preferably at least 30 percent, and most preferably at least 40 percent; but is preferably no greater than 99 percent, more preferably no greater than 95 percent, and most preferably no greater than 90 percent. If the desired product of the process is a polyaniline polymer which is insoluble in water and methanol, these preferred selectivities and conversions also apply to such processes.

The conductivity of the polyaniline polymer obtained by the processes described herein is preferably at least $10^{-9}$ Siemens/cm (S/cm), more preferably at least 0.01 S/cm, and most preferably at least 0.1 S/cm. The conductivity of the polyaniline polymer may be determined as follows: The polyaniline polymer is isolated from the polymerization reaction product and then dried under dynamic vacuum at 45° C. overnight. A pellet is made from the solid in a press. Its two surfaces are painted with a conductive primer and the resistance is measured from one face to the opposite face of the sample with a multimeter. The conductivity is calculated by dividing the distance between the two painted surfaces (typically about 100 mm, but measured for each sample) by the area of the painted surface (typically 1 $cm^2$) and by the resistance in ohm to give the conductivity in S/cm. If the polyaniline polymer is soluble in the reaction mixture, it may be isolated therefrom by distilling off the solvents.

The average molecular weight of the polyaniline polymer obtained by the processes described herein, is preferably at least 5,000, more preferably at least 10,000, and most preferably at least 15,000. If the polyaniline polymer is insoluble in the reaction mixture, these molecular weights represent the average molecular weight of the precipitated polymer.

Optimization of the yield of polyaniline polymer is believed to be favored by the use of the "moderately oxidizing" combinations of hydrogen peroxide, acid, catalyst, and chloride and/or bromide ion source (if different from the acid) described herein, as well as relatively low reaction temperatures and a relatively acidic reaction medium. A convenient test for determining whether a particular combination is "moderately oxidizing" is to determine whether a mixture consisting of hydrogen peroxide, acid, catalyst, and chloride and/or bromide source (if different from the acid) will polymerize aniline by oxidation, but will not oxidize m-nitroaniline under the following reaction conditions: Aniline, hydrogen peroxide, the Lewis acid(s) (used as a 1-N solution), and the metal-containing compound(s) or complex(es) are combined in amounts sufficient to provide a mixture having a molar ratio of 1:1.25:10:0.05. The mixture is stirred at 25° C. for 2 hours. Polyaniline polymer is isolated by filtration and confirmed by measurement of its electrical conductivity. The presence of polyaniline polymer means that the combination will polymerize aniline by oxidation.

To determine if the same combination will oxidize m-nitroaniline, the same procedure is carried out except that m-nitroaniline is substituted for aniline. The absence of polynitroaniline and other non-halogenated oxidation products after stirring for 2 hours, indicated by, for example, Gas Chromatography/Mass Spectroscopy or Liquid Chromatography/Mass Spectroscopy, means that the mixture will not oxidize m-nitroaniline. The absence of darkening of the reaction mixture may also be used as a convenient routine experimental method of determining that oxidation has not occurred.

It is best to prepare an identical mixture but without any added hydrogen peroxide for comparison, since darkening could also occur by air oxidation. A positive m-nitroaniline test indicates that the particular reaction combination is not "moderately oxidizing", but instead is over-oxidizing.

As used herein, references to polymerizing aniline monomers by "oxidation" refer to reactions which result in the formation of head-to-tail bonds between the aniline monomers and other aniline monomers or aniline oligomers, which ultimately result in the formation of polyaniline polymers having a molecular weight of greater than 2000, and specifically not to reactions solely resulting in the halogenation of the aniline monomers. The first step in the reaction sequence that leads to the formation of head-to-tail bonds between the aniline monomers is generally thought to be removal of an electron resulting in the formation of an intermediate radical cation. Radical cations can undergo reactions other than head-to-tail coupling, such as head-to-head or tail-to-tail coupling. Furthermore, initially formed head-to-tail reaction products can be further oxidized and hydrolyzed, giving a wide variety of final products. If the Lewis acid contains a halogen substituent, a portion of the aniline monomers may undergo halogenation resulting in a halogenated aniline monomer. While halogenation is a type of oxidation reaction, it does not promote the formation of head-to-tail bonds between the aniline monomers. Thus, use of the test procedure described above with HBr or any acidic mixture containing bromide ions may result in bromination of m-nitroaniline, but may not result in radical cation formation. If this combination of bromide-containing Lewis acid and metal compound or complex also polymerizes aniline, then it may be considered to be "moderately oxidizing". In all cases, High Pressure Liquid Chromatography (HPLC), Nuclear Magnetic Resonance (NMR), infrared spectroscopy, or a combination thereof may be used to distinguish between halogenated products and those resulting from radical cation formation.

ILLUSTRATIVE EMBODIMENTS

The following examples are given to illustrate the invention and should not be interpreted as limiting it in any way. Unless stated otherwise, all parts and percentages are given by weight.

EXAMPLES 1–11

Water (600 mL), 92 mL concentrated (12M) HCl, 0.2 g $FeSO_4 \cdot 7H_2O$ and 20.6 g aniline are added to a jacketed glass reactor fitted with an air-driven stir shaft and poly (tetrafluoroethylene)-coated blade assembly. The temperature of the fluid circulating through the jacket is maintained at 25° C. 27 g of 35 percent $H_2O_2$ diluted with 50 mL water are added dropwise over the course of 90 minutes. The rate of $H_2O_2$ addition is such that the temperature of the reaction mixture does not exceed 29° C. The mixture is stirred for a total time of 3 hours and 30 minutes. The mixture is then filtered and washed 3 times with 800 mL of 0.1 molar HCl in water, then 3 times with 800 mL of 0.1 molar HCl in methanol. The solid is dried in vacuum at 45° C. until constant weight is attained. The yield is 19.0 g of polyaniline hydrogen chloride salt (78 percent yield (of polyaniline insoluble in both water and methanol) based on aniline charged to the reactor). The product has a conductivity of 0.63 S/cm. This procedure is repeated for Examples 2–11, using the process conditions shown in Table 1. The process conditions and results of Examples 1–11 are summarized in Table 1. In all cases, the catalyst is 0.0025 molar $FeSO_4 \cdot 7H_2O$. In the following table, R is the molar ratio of hydrogen peroxide to aniline.

TABLE 1

| Example | Acid | [acid], molar | Temp. (°C.) | [aniline], molar | Time (hr.) | R | yield, (%) | σ, S/cm |
|---|---|---|---|---|---|---|---|---|
| 1 | HCl | 1.6 | 26–29 | 0.32 | 3.5 | 1.25 | 78 | 0.63 |
| 2 | HCl | 1.6 | 25.5–27 | 0.32 | 2.7 | 1.00 | 61 | 0.95 |
| 3 | HCl | 1.6 | 26–29.5 | 0.32 | 4.0 | 1.50 | 78 | 0.31 |
| 4 | HCl | 1.6 | 27–30 | 0.79 | 3.0 | 1.25 | 80 | 0.32 |
| 5 | HCl | 1.6 | 8–9 | 0.78 | 19.0 | 1.25 | 66 | 0.65 |
| 6 | HCl | 3.9 | 6–8.5 | 0.77 | 21.5 | 1.25 | 85 | 2.40 |
| 7 | HCl | 3.9 | 6–7 | 0.77 | 20.0 | 1.15 | 77 | 3.64 |
| 8 | HCl | 6.0 | 0–1 | 0.78 | 22.0 | 1.25 | 49.6 | 0.059 |
| 9 | HBr | 1.6 | 25–28 | 0.81 | 3.0 | 1.25 | 85.3 | 1.08 |
| 10 | 10 mole % HBr/ 90 mole % HCl | 1.6 | 24–27 | 0.79 | 3.7 | 1.25 | 79.5 | 4.37 |
| 11 | 25 mole % HBr/ 75 mole % HCl | 1.6 | 24–29 | 0.79 | 3.5 | 1.25 | 79.4 | 3.59 |

Table 2 gives the results of the test procedure used to determine whether certain combinations of catalyst, hydrogen peroxide, Lewis acid, and chloride or bromide ion source are "moderately oxidizing". For example, Table 2 shows that the combination of the iron catalyst and $H_2SO_4$ or $HClO_4$ without any chloride or bromide present does cause oxidation of m-nitroaniline, and therefore is not considered to be "moderately oxidizing" and accordingly is not a preferred combination for carrying out the processes described herein. Preferred catalyst/acid combinations are those that polymerize aniline (+ symbol) but do not oxidize m-nitroaniline (− symbol). As used herein "PTSA" means para-toluenesulfonic acid and "BSA" means benzenesulfonic acid.

TABLE 2

| Acid | Catalyst | Polymerize aniline | Oxidize m-nitroaniline |
|---|---|---|---|
| HCl | Fe (II) | + | − |
| HCl | Fe (III) | + | − |
| HCl | Cu (I) | + | − |
| HCl | Cu (II) | + | − |
| HCl | Nb (V) | − | − |
| HCl | Ru (III) | + | − |
| HBr | Fe (II) | + | − |
| HBr | Cu (I) | + | − |
| HBr | Cu (II) | + | − |
| H$_2$SO$_4$ | Fe (II) | + | + |
| H$_2$SO$_4$ | Fe (III) | + | + |
| H$_2$SO$_4$ | Cu (II) | − | − |
| HClO$_4$ | Fe (II) | + | + |
| HClO$_4$ | Fe (III) | + | + |
| HClO$_4$ | Cu (II) | − | − |
| HNO$_3$ | Fe (II) | + | + |
| HNO$_3$ | Fe (III) | + | + |
| H$_3$PO$_4$ | Fe (II) | − | − |
| H$_3$PO$_4$ | Fe (III) | − | − |
| H$_3$PO$_4$ | Cu (II) | − | − |
| HCl | Mo (VI) | − | − |
| HCl | Co (II) | − | − |
| HCl | Mn (II) | − | − |
| HCl | Ni (II) | − | − |
| H$_2$SO$_4$ | Co (II) | − | − |
| H$_2$SO$_4$ | Mn (II) | − | − |
| H$_2$SO$_4$ | Ni (II) | − | − |
| HCl | Sb (III) | − | − |
| HCl + pTSA | Fe (II) | + | − |
| H$_2$SO$_4$ + NH$_4$Cl + BSA | Fe (II) | + | − |
| HBr + pTSA | Fe (II) | + | − |

EXAMPLE 12

A gas chromatographic method is used to measure the conversion of aniline during the polymerization, as follows: A Hewlett-Packard 5790A gas chromatograph is fitted with a 6' long, ⅛" diameter stainless steel, 80/100 mesh Chromosorb™ 103 column. The column is operated isothermally at 200° C. with helium carrier gas at a flow rate of approximately 25 mL/min. The thermal conductivity detector is operated at 200° C. For analysis, a 1-mL sample is withdrawn from the reactor and added to a vial containing 0.8 g of 50 percent aqueous sodium hydroxide, 1 mL of water and 1 mL of toluene. The mixture is carefully shaken, and after phase separation, 1 µL of the upper toluene layer is injected into the gas chromatograph. A calibration curve determined by preparation of known aniline concentrations in aqueous HCl shows the detector response to be linear over the entire range of aniline concentrations of interest.

A 1-L solution is prepared as follows: aniline (37.2 g, 0.4 molar), ammonium chloride (85.6 g, 1.6 molar), benzenesulfonic acid hydrate (69.8 g, 0.4 molar), concentrated sulfuric acid (66.7 mL, 1.2 molar), and ferrous sulfate heptahydrate (0.715 g, 0.0026 molar) are dissolved in water. After cooling, the volume is brought up to 1 L with water in a volumetric flask. 700 mL of this solution are added to a 1-L jacketed reactor. The mixture is stirred at 500 rpm and the temperature adjusted to 27° C. 34 g of 35 percent hydrogen peroxide and 30 mL of water are added dropwise over a period of 70 minutes. During this time, the contents of the reactor reach 29° C. Analysis of the reactor contents after 18.5 hours shows only about 70 percent conversion of the aniline. At this point, an additional 11 g of 35 percent hydrogen peroxide and 10 mL water are added. At 22.5 hours, analysis shows 86 percent conversion of the aniline. The contents of the reactor are filtered using a medium (10–15 µm) glass filter funnel and washed twice with 500 mL of 0.1 molar benzenesulfonic acid in water, then 4 times with 500 mL of 0.1 molar benzenesulfonic acid in methanol. The product is dried in vacuum at 45° C., yielding 35.1 g of dark green solid. The yield of benzenesulfonic acid doped polyaniline is 74 percent of theoretical, based on aniline added to the reactor. Since the aniline conversion is determined to be 86 percent, the selectivity of polyaniline formation is also 86 percent. The efficiency of hydrogen peroxide use is 56 percent of theoretical. The electrical conductivity of the product is 0.78 S/cm.

EXAMPLES 13–19

The following Tables (3 and 4) summarize the data obtained from Example 12, as well as additional examples generated following a procedure similar to that of Example 12. The catalyst in each case is 0.0025 molar ferrous sulfate, except for Example 18 where the catalyst is 0.0025 molar RuCl$_3$, and Example 19 where the catalyst is 0.01 molar CuCl. The term "selectivity" in Table 4 refers to the selectivity of the process to polyaniline insoluble in both water and methanol. The term "conversion" refers to the conversion of the aniline monomer. The term "efficiency" refers to the efficiency of the hydrogen peroxide use.

TABLE 3

(Reaction Mixture Compositions and Conditions for Examples 12–19)

| Example | Composition (molar) | Temp. (°C.) | Time (hrs) |
|---|---|---|---|
| 12 | aniline (0.4); NH$_4$Cl (1.6); H$_2$SO$_4$ (1.2); BSA (0.4) | 25–29 | 22.5 |
| 13 | aniline (0.4); HCl (1.2); pTSA (0.4) | 25–28 | 5.8 |
| 14 | aniline (1.6); HCl (2.0) | 26–29 | 6.5 |
| 15 | aniline (0.4); HBr (0.6); pTSA (0.4) | 25–27 | 6.3 |
| 16 | aniline (0.84); HCl (1.6) | 25–28 | 3.5 |
| 17 | aniline (0.3); HCl (3.2); pTSA (0.3) | 5–7 | 16.4 |
| 18 | aniline (0.77); HCl (1.6) | 25–27 | 22.4 |
| 19 | aniline (0.81); HCl (1.6) | 25–27 | 23.4 |

TABLE 4

(Results for Examples 12–19)

| Example | % yield | % conversion | % selectivity | % efficiency | σ (S/cm) |
|---|---|---|---|---|---|
| 12 | 74 | 86 | 86 | 56 | 0.78 |
| 13 | 74 | 86 | 86 | 55 | 4.2 |
| 14 | 63 | 74 | 86 | 63 | 0.1 |
| 15 | 65 | 84 | 78 | 50 | 0.32 |
| 16 | 81 | 83 | 97 | 81 | 1.9 |
| 17 | 69 | 90 | 76 | 54 | 0.16 |
| 18 | 76 | 81 | 94 | 76 | 0.17 |
| 19 | 71 | 74 | 96 | 71 | 0.72 |

EXAMPLE 20

A 500-mL solution of acid and catalyst is prepared as follows: p-toluenesulfonic acid (95.1 g, 1 molar), concentrated HCl (62.5 mL, 1.5 molar) and ferroussulfate heptahydrate (0.357 g, 0.00257 molar) are dissolved in water. The solution is added to a 500-mL volumetric flask and, after cooling, the volume is brought up to 500 mL with water. The entire contents of the flask are added to a 1 -L jacketed reactor. The mixture is stirred at 890 RPM while aniline (48.15 g, 0.517 moles) is slowly added. During the addition of aniline, its solubility in the medium is exceeded and a white solid precipitate forms. The stir rate is sufficient to keep the mixture from forming an immobilized mass despite the considerable amount of undissolved solid present. The temperature is adjusted to 25° C. and maintained near this value by pumping cooling fluid through the jacket. Over a period of 2 hours, hydrogen peroxide solution (81.7 g 35 percent $H_2O_2$, 0.84 mole, +50 mL water) are added slowly using a dropping funnel. The mixture is stirred a total of 5 hours, then the contents of the reactor are filtered using a medium glass filter funnel (10–15 μm) and washed with 1 L of 0.1 molar p-toluenesulfonic acid (pTSA) in water, followed by two 1 -L portions of 0.1 molar pTSA in methanol. The dark green solid is dried overnight in vacuum at 45° C., yielding 51.5 g of polyaniline (56.4 percent yield based on aniline added to the reactor). Gas chromatography indicates that the conversion of aniline is 73 percent, giving a selectivity of polyaniline formation of 77 percent. The efficiency of hydrogen peroxide use is 43 percent of theoretical. The electrical conductivity of the product is 0.48 S/cm.

EXAMPLE 21

Aniline (10.2 g, 0.11 mole), 60 mL of 4.8 molar aqueous HCl, 0.10 g ferrous sulfate heptahydrate and 190 mL water are added to a 500-mL flask, giving approximate aniline, HCl and iron concentrations of 0.44 molar, 1.2 molar, and $1.4\times10^{-3}$ molar, respectively. The flask is immersed in a constant temperature bath at 27° C. The contents of the flash are stirred by an air driven stir shaft and blade assembly. A solution of 12.2 g of 35 percent hydrogen peroxide, 0.10 g sodium persulfate and 0.10 g trisodium phosphate diluted to 40 mL with water is slowly added using a dropping funnel at such a rate that the temperature of the reaction mixture does not exceed 32° C. After all the oxidant solution has been added and as soon as reaction mixture begins to cool, 12.2 g (0.064 mole) of p-toluenesulfonic acid is added. The mixture is then stirred for a total time of 14 hours. The reaction mixture is then filtered and the solid product is washed with water and methanol. The solid is dried in a vacuum oven to give 17 g of green polyaniline (87 percent yield based on aniline). The electrical conductivity of the product is 1.05 S/cm. Elemental analysis of the product gives 60.2 percent carbon, 4.5 percent hydrogen, 7.43 percent nitrogen, 8.3 percent sulfur and 1.06 percent chlorine, which is consistent with the following formula for the repeating dimeric polyaniline unit: $C_{12}H_9N_2(HCl)_{0.12}$(p-toluenesulfonic acid)$_{1.0}(H_2O)_{1.4}$.

What is claimed is:

1. A batch process for preparing polyaniline polymer which comprises contacting aniline monomers with (a) hydrogen peroxide, (b) at least one acid, at least a portion of which is hydrogen chloride, hydrogen bromide, or a mixture thereof, and (c) a catalytic amount of at least one metal-containing compound or complex, forming a polymerization reaction mixture thereby, under reaction conditions sufficient to form a polymerization reaction product containing polyaniline polymer wherein (i) the total amount of aniline monomers added to the polymerization reaction mixture is at least 0.25 moles per liter, based on the volume of the polymerization reaction product;

(ii) the molar ratio of hydrogen peroxide:aniline monomers added to the reaction mixture is at least 0.3:1.0;

(iii) the molar ratio of acid:aniline monomers addend to the reaction mixture is greater than 1:1; and (iv) sufficient hydrogen peroxide is added to the reaction mixture to convert from 30 to 99 percent of the aniline monomers present, and the polyaniline polymer is separated from the reaction mixture before the average molecular weight of the polyaniline polymer present in the reaction mixture at the time the desired conversion is achieved decreases more than 50 percent due to hydrolysis of the polyaniline polymer.

2. The process of claim 1 wherein component (c) is present in an amount, based on the moles of hydrogen peroxide added to the reaction mixture, of at least 0.001 mole percent.

3. The process of claim 1 wherein component (c) is present in an amount, based on the moles of hydrogen peroxide added to the reaction mixture, of at least 0.1 mole percent.

4. The process of claim 1 wherein the polyaniline polymer is separated from the reaction mixture before the average molecular weight of the polyaniline present in the reaction mixture at the time the desired conversion is achieved decreases more than 10 percent due to hydrolysis of the polyaniline polymer.

5. The process of claim 1 wherein (a) at least 30 percent of the aniline monomers react to form polymeric during the polymerization reaction, and (b) the selectivity of the polymerization reaction to polyaniline polymer having a molecular weight of greater than 2000 and a conductivity of greater than $10^{-9}$ S/cm, based on the molar amount of aniline monomers reacted to form polymers, is at least 50 percent.

6. The process of claim 1 wherein (a) at least 30 percent of the aniline monomers react to form polymers during the polymerization reaction, (b) at least a portion of the polyaniline polymer is insoluble in water and methanol, and (c) the selectivity of the polymerization reaction to such insoluble polymer having a molecular weight of greater than 2000 and a conductivity of greater than $10^{-9}$ S/cm, based on the molar amount of aniline monomers reacted to form polymers, is at least 50 percent.

7. The process of claim 1 wherein the acid is employed in an amount sufficient to provide an excess proton concentration in the reaction mixture of at least 0.1 molar.

8. The process of claim 1 wherein the acid is employed in an amount sufficient to provide an excess proton concentration in the reaction mixture of from 0.5 molar to 6 molar.

9. The process of claim 1 wherein the aniline monomer is aniline and the polyaniline polymer has a conductivity of at least 0.1 S/cm.

10. A The process of claim 1 wherein the metal-containing compound or complex contains iron.

11. The process of claim 1 wherein the metal-containing compound or complex contains copper.

12. The process of claim 1 wherein the polymerization reaction mixture additionally comprises at least one Lewis acid salt.

13. A batch process for preparing polyaniline polymer which comprises contacting aniline with (a) hydrogen peroxide, (b) at least one acid, at least a portion of which is hydrogen chloride, hydrogen bromide, or a mixture thereof, and (c) a catalytic amount of at least one metal-containing compound or complex, forming a polymerization reaction mixture thereby, under reaction conditions sufficient to form a polymerization reaction product containing polyaniline, wherein (i) the total amount of aniline monomers added to the polymerization reaction mixture is at least 0.25 moles per liter, based on the volume of the polymerization reaction product;

(ii) the molar ratio of hydrogen peroxide:aniline monomers added to the reaction mixture is at least 0.3:1.0; and (iii) the molar ratio of acid:aniline monomers added to the reaction mixture is greater than 1:1.

14. The process of claim 13 wherein the polymerization reaction mixture additionally comprises at least one Lewis acid salt.

15. A process for preparing polyaniline polymer which comprises contacting aniline monomers with (a) hydrogen peroxide, (b) at least one Lewis acid other than hydrogen chloride or hydrogen bromide, (c) at least one metal-containing compound or complex, and (d) a source of chloride and/or bromide ions different from (b), forming a polymerization reaction mixture thereby, under reaction conditions sufficient to form a polymerization reaction product comprising polyaniline polymer, wherein the molar ratio of acid:aniline monomers added to the reaction mixture is greater than 1:1.

16. The process of claim 15 wherein the polymerization reaction mixture additionally comprises at least one Lewis acid salt.

17. The process of claim 15 wherein component (c) is present in an amount, based on the moles of hydrogen peroxide added to the reaction mixture, of at least 0.001 mole percent.

18. The process of claim 15 wherein component (c) is present in an amount, based on the moles of hydrogen peroxide added to the reaction mixture, of at least 0.1 mole percent.

19. The process of claim 15 wherein sufficient hydrogen peroxide is added to the reaction mixture to convert from 30 to 99 percent of the aniline monomers present, and the polyaniline polymer is separated from the reaction mixture before the average molecular weight of the polyaniline polymer present in the reaction mixture at the time the desired conversion is achieved decreases more than 50 percent due to hydrolysis of the polyaniline polymer.

20. The process of claim 19 wherein the polyaniline polymer is separated from the reaction mixture before the average molecular weight of the polyaniline present in the reaction mixture at the time the desired conversion is achieved decreases more than percent due to hydrolysis of the polyaniline polymer.

21. The process of claim 15 wherein (a) at least 30 percent of the aniline monomers react to form polymers during the polymerization reaction, and (b) the selectivity of the polymerization reaction to polyaniline polymer having a molecular weight of greater than 2000 and a conductivity of greater than $10^{-9}$ S/cm, based on the molar amount of aniline monomers reacted to form polymers, is at least 50 percent.

22. The process of claim 15 wherein (a) at least 30 percent of the aniline monomers react to form polymer during the polymerization reaction, (b) at least a portion of the polyaniline polymer is insoluble in water and methanol, and (c) the selectivity of the polymerization reaction to such insoluble polymer having a molecular weight of greater than 2000 and a conductivity of greater than $10^{-9}$ S/cm, based on the molar amount of aniline monomers reacted to form polymers, is at least 50 percent.

23. The process of claim 15 wherein the acid is employed in an amount sufficient to provide an excess proton concentration in the reaction mixture of at least 0.1 molar.

24. The process of claim 23 wherein the acid is employed in an amount sufficient to provide an excess proton concentration in the reaction mixture of from 0.5 molar to 6 molar.

25. The process of claim 15 wherein the aniline monomer is aniline and the polyaniline polymer has a conductivity of at least 0.1 S/cm.

26. The process of claim 15 wherein the metal-containing compound or complex contains iron.

27. The process of claim 15 wherein the metal-containing compound or complex contains copper.

28. The process of claim 15 wherein the polymerization reaction mixture additionally comprises hydrogen chloride, hydrogen bromide, or a mixture thereof.

29. The process of claim 15 which is a batch process and wherein the total amount of aniline monomers added to the polymerization reaction mixture is at least 0.25 moles per liter, based on the volume of the polymerization reaction product.

30. The process of claim 15 wherein the molar ratio of hydrogen peroxide:aniline monomers added to the reaction mixture is at least 0.3:1.0.

31. The process of claim 15 wherein component (d) is present in an amount sufficient to provide a concentration of halide ions in the polymerization reaction mixture of from 0.1 molar to 6 molar.

32. The process of claim 15 wherein the combination of (a), (b), (c), and (d) is moderately oxidizing.

33. The process of claim 15 wherein the aniline monomer is aniline.

34. The process of claim 33 wherein the polymerization reaction mixture additionally comprises at least one Lewis acid salt.

35. The process of claim 33 wherein the combination of (a), (b), (c), and (d) is moderately oxidizing.

36. The process of claim 1 wherein component (c) comprises a ruthenium-containing compound or complex.

37. The process of claim 36 wherein the polymerization reaction mixture additionally comprises at least one Lewis acid salt.

38. A batch process for preparing polyaniline polymer which comprises contacting aniline monomers in a reaction medium containing hydrogen peroxide and a catalyst for the polymerization thereof and a solvent or dispersing agent for the monomers or their protonated derivatives under reaction conditions sufficient to produce a polymerization reaction product containing polyaniline polymer wherein:

(a) at least 80 percent by weight of the polyaniline polymer in the polymerization reaction product which is insoluble in water and methanol has a molecular weight of at least 5000 and a conductivity of at least 0.001 S/cm;

(b) the total amount of aniline monomers added to the reaction mixture is at least 0.5 moles of aniline per liter, based on the volume of the polymerization reaction product; and (c) at least 30 percent of the aniline monomers react to form polymers during the polymerization reaction; and sufficient hydrogen peroxide is added to the reaction mixture to convert from 30 to 99 percent of the aniline monomers present, and the polyaniline polymer is separated from the reaction mixture before the average molecular weight of the polyaniline polymer present in the reaction mixture at the time the desired conversion is achieved decreases more than 50 percent due to hydrolysis of the polyaniline polymer.

39. The process of claim 38 wherein the aniline monomers are aniline and the polyaniline polymer has a conductivity of at least 0.1 S/cm.

40. The process of claim 38 wherein the metal-containing compound or complex contains iron.

41. The process of claim 38 wherein the polyaniline polymer is separated from the reaction mixture before the average molecular weight of the polyaniline present in the reaction mixture at the time the desired conversion is achieved decreases more than percent due to hydrolysis of the polyaniline polymer.

42. The process of claim 38 wherein (a) at least 30 percent of the aniline monomers react to form polymers during the polymerization reaction, and (b) the selectivity of the polymerization reaction to polyaniline polymer having a molecular weight of greater than 2000 and a conductivity of greater than $10^{-9}$ S/cm, based or) the molar amount of aniline monomers reacted to form polymers, is at least 50 percent.

43. The process of claim 38 wherein (a) at least 30 percent of the aniline monomers react to form polymers during the polymerization reaction, (b) at least a portion of the polyaniline polymer is insoluble in water and methanol, and (c) the selectivity of the polymerization reaction to such insoluble polymer having a molecular weight of greater than 2000 and a conductivity of greater than $10^{-9}$ S/cm, based on the molar amount of aniline monomers reacted to form polymers, is at least 50 percent.

44. The process of claim 38 wherein the acid is employed in an amount sufficient to provide an excess proton concentration in the reaction mixture of at least 0.1 molar.

45. The process of claim 38 wherein the acid is employed in an amount sufficient to provide an excess proton concentration in the reaction mixture of from 0.5 molar to 6 molar.

46. The process of claim 38 wherein the aniline monomer is aniline and the polyaniline polymer has a conductivity of at least 0.1 S/cm.

47. The process of claim 1 wherein the hydrogen peroxide is added to the reaction mixture after the addition of the aniline monomers.

48. The process of claim 13 wherein the hydrogen peroxide is added to the reaction mixture after the addition of the aniline.

* * * * *

UNITED STATES PATENT AND TRADEMARK OFFICE
CERTIFICATE OF CORRECTION

| | | |
|---|---|---|
| PATENT NO. | : 5,792,830 | Page 1 of 1 |
| APPLICATION NO. | : 08/762481 | |
| DATED | : August 11, 1998 | |
| INVENTOR(S) | : Stephen A. Noding, Susan J. Babinec and Carey L. Scortichini | |

It is certified that error appears in the above-identified patent and that said Letters Patent is hereby corrected as shown below:

Title page, Item (56), FOREIGN PATENT DOCUMENTS, line 2, "5/1995" should correctly read -- 5/1994 --

Column 12, claim 1, line 1, "addend" should correctly read -- added --

Column 12, claim 5, line 25 "polymeric" should correctly read -- polymers --

Column 13, claim 20, line 44 following "than" insert -- 10 --

Column 15, claim 41, line 3 following "than" insert -- 10 --

Column 15, claim 42, line 10, "or)" should correctly read -- on --

Signed and Sealed this

Seventeenth Day of July, 2007

JON W. DUDAS
*Director of the United States Patent and Trademark Office*